US010277714B2

(12) United States Patent
Bullock et al.

(10) Patent No.: US 10,277,714 B2
(45) Date of Patent: Apr. 30, 2019

(54) PREDICTING HOUSEHOLD DEMOGRAPHICS BASED ON IMAGE DATA

(71) Applicant: Facebook, Inc., Menlo Park, CA (US)

(72) Inventors: William Bullock, Palo Alto, CA (US); Liang Xu, Bellevue, WA (US); Li Zhou, Campbell, CA (US)

(73) Assignee: Facebook, Inc., Menlo Park, CA (US)

( * ) Notice: Subject to any disclaimer, the term of this patent is extended or adjusted under 35 U.S.C. 154(b) by 99 days.

(21) Appl. No.: 15/592,108

(22) Filed: May 10, 2017

(65) Prior Publication Data

US 2018/0332140 A1    Nov. 15, 2018

(51) Int. Cl.

| | |
|---|---|
| *G06F 15/173* | (2006.01) |
| *H04L 29/08* | (2006.01) |
| *G06K 9/66* | (2006.01) |
| *G06F 17/27* | (2006.01) |
| *G06F 16/335* | (2019.01) |
| *G06Q 30/02* | (2012.01) |
| *G06K 9/00* | (2006.01) |

(52) U.S. Cl.
CPC .......... *H04L 67/327* (2013.01); *G06F 16/337* (2019.01); *G06F 17/277* (2013.01); *G06F 17/2785* (2013.01); *G06K 9/66* (2013.01); *G06Q 30/0269* (2013.01); *H04L 67/306* (2013.01); *G06K 9/00677* (2013.01)

(58) Field of Classification Search
CPC . H04L 67/327; H04L 67/306; G06F 17/2785; G06K 9/66; G06K 9/00677
See application file for complete search history.

(56) References Cited

U.S. PATENT DOCUMENTS

| | | | |
|---|---|---|---|
| 7,505,621 | B1 | 3/2009 | Agrawal et al. |
| 7,953,690 | B2 | 5/2011 | Luo et al. |
| 8,180,112 | B2 | 5/2012 | Kurtz et al. |
| 8,611,601 | B2 | 12/2013 | Calman et al. |

(Continued)

OTHER PUBLICATIONS

Bachrach, Y, et al., "Your Digital Image: Factors Behind Demographic and Psychometric Predictions from Social Network Profiles," *Proc. Of the 13th Intl. Conf. On Autonomous Agents and Multiagent Systems* (AAMAS 2014), two pages.

(Continued)

*Primary Examiner* — Richard G Keehn
(74) *Attorney, Agent, or Firm* — Fenwick & West LLP

(57) ABSTRACT

An online system predicts household features of a user, e.g., household size and demographic composition, based on image data of the user, e.g., profile photos, photos posted by the user and photos posted by other users socially connected with the user, and textual data in the user's profile that suggests relationships among individuals shown in the image data of the user. The online system applies one or more models trained using deep learning techniques to generate the predictions. For example, a trained image analysis model identifies each individual depicted in the photos of the user; a trained text analysis model derive household member relationship information from the user's profile data and tags associated with the photos. The online system uses the predictions to build more information about the user and his/her household in the online system, and provide improved and targeted content delivery to the user and the user's household.

20 Claims, 4 Drawing Sheets

(56) References Cited

U.S. PATENT DOCUMENTS

| | | | |
|---|---|---|---|
| 8,798,401 B1* | 8/2014 | Johnson | G06F 17/30244 382/305 |
| 9,489,592 B2 | 11/2016 | You et al. | |
| 9,589,205 B2 | 3/2017 | Joshi et al. | |
| 9,679,044 B2 | 6/2017 | Bruich et al. | |
| 9,740,915 B2 | 8/2017 | Wiegenfeld et al. | |
| 9,830,533 B2 | 11/2017 | Cavalin et al. | |
| 10,019,653 B2 | 7/2018 | Wilf et al. | |
| 2006/0005045 A1* | 1/2006 | Nakase | G07C 9/00087 713/190 |
| 2007/0008321 A1* | 1/2007 | Gallagher | G06F 17/30265 345/473 |
| 2010/0179874 A1* | 7/2010 | Higgins | G06K 9/00664 705/14.53 |
| 2010/0312609 A1 | 12/2010 | Epshtein et al. | |
| 2013/0039547 A1* | 2/2013 | Liu | G06K 9/00288 382/115 |
| 2013/0124309 A1 | 5/2013 | Traasdahl et al. | |
| 2013/0176442 A1* | 7/2013 | Shuster | G06K 9/62 348/207.1 |
| 2014/0067525 A1* | 3/2014 | Soupliotis | G06Q 30/0269 705/14.45 |
| 2014/0244488 A1* | 8/2014 | Kim | G06Q 20/02 705/39 |
| 2015/0125042 A1* | 5/2015 | Haden | G06K 9/00771 382/105 |
| 2015/0142888 A1* | 5/2015 | Browning | H04L 12/1831 709/204 |
| 2015/0193472 A1 | 7/2015 | Medvedovsky et al. | |
| 2015/0347593 A1* | 12/2015 | Tsai | G06F 17/30867 707/722 |
| 2016/0019411 A1 | 1/2016 | Bart et al. | |
| 2016/0086206 A1* | 3/2016 | Churchill | H04L 67/306 705/7.32 |
| 2016/0148298 A1 | 5/2016 | Tang et al. | |
| 2017/0053516 A1* | 2/2017 | Wu | G08B 21/24 |
| 2017/0076323 A1 | 3/2017 | Palanciuc et al. | |
| 2017/0186044 A1 | 6/2017 | Tal-Israel | |
| 2017/0193533 A1 | 7/2017 | Lai et al. | |
| 2017/0289606 A1* | 10/2017 | Tumanov | H04N 21/251 |
| 2017/0337602 A1* | 11/2017 | Davis | G06Q 30/0607 |
| 2017/0347222 A1* | 11/2017 | Kanter | H04W 4/70 |
| 2018/0114406 A1* | 4/2018 | Shigeta | B32B 27/08 |
| 2018/0129929 A1 | 5/2018 | Shigenaka et al. | |
| 2018/0227959 A1* | 8/2018 | Fraccaroli | H04W 76/14 |
| 2018/0246910 A1* | 8/2018 | Mitchell | G06F 17/30277 |
| 2018/0260840 A1* | 9/2018 | Jeon | G06Q 30/0246 |
| 2018/0314915 A1 | 11/2018 | Cai et al. | |

OTHER PUBLICATIONS

Culotta, A. et al., "Predicting the Demographics of Twitter Users from Website Traffic Data," *Proc. Of the 29th AAAI Conf. in Artificial Intelligence*, 2015, pp. 72-78.

Dougnon, R. Y. et al., "Inferring Social Network User Profiles using a Partial Social Graph," 2016, thirty-five pages.

Feng, H. et al., "Mining User-Contributed Photos for Personalized Product Recommendation," *Neurocomputing*, 2013, 409-420.

Han, H. et al., "Demographic Estimation from Face Images: Human vs. Machine Performance," IEEE *Trans. On Pattern Analysis and Machine Intelligence*, 2014, eighteen pages.

Lam, B., "Can Google Street View Images Predict Household Income?" *The Atlantic*, Dec. 10, 2015, two pages.

PR Newswire, "Ad Targeting Gets Visual: Ditto Labs Launches Tools to Help Advertisers Use Public Photos to Reach Consumers: Marketers Can Now Buy Media Based on Brand Affinities Expressed in Photos," Dec. 17, 2014, two pages.

Xie, P. et al., "Mining User Interests from Personal Photos," *Assoc. For the Advancement of Artificial Intelligence*, 2015, seven pages.

Yang, C. et al., "Online Social Network Image Classification and Application Based on Deep Learning," 2016 3rd Intl. Conf on Eng. Tech. and App. (ICETA 2016), pp. 41-46.

You, Q., "The Eyes of the beholder: Gender prediction using images posted in Online Social Networks," Dec. 31, 2014, five pages.

\* cited by examiner

PREDICTING HOUSEHOLD DEMOGRAPHICS BASED ON IMAGE DATA

BACKGROUND

This disclosure generally relates to online systems, and more specifically to predictions of household features of a user, e.g., size of the household and demographic composition of the household, based on image data associated with the user.

Content providers produce content that is targeted to certain audiences within online systems. Users interact with content received from the online systems. With the advent of online systems, such as social networking systems, content providers have increasingly relied on the online systems to effectively deliver content to their target users in target households. However, existing solutions of content delivery to a target household are not effective. For example, the content providers produce and send the content items to the target household without knowing the size of the target household and the demographic composition of the household (e.g., number of members in the household, characteristics of the household members, shared interests of the household members, etc.) Furthermore, the content providers often have no knowledge of what electronic devices are used by the household users to access content provided by the content providers, how the electronic devices in the household are associated with the household users, and whether the household users associated with the electronic devices in the household are users of the online system that receive content from the content providers. Without such knowledge of a user's household features, most of content items that are sent to the user are poorly tailored to the user and are likely ignored by the user. As a result, the content providers waste resources while sending the content items to the user.

SUMMARY

An online system predicts household features of a user, e.g., size and demographic composition of the user's household, based on image data of the user. Examples of image data of a user include profile photos of the user, e.g., profile photos of the same user on different online systems, e.g., FACEBOOK™ and INSTAGRAM™. The image data of the user may also include photos posted by other users that may include members of the user's household. The online system predicts the household features of the user based on photos of the user and textual data in the user's profile that suggests the household features of the user. For example, the online system may determine a number of persons identified in each photo, a frequency of each identified person or each identified group of persons among the photos of the user, tag information of each photo indicating relationships (e.g., a tag indicating a husband, wife, daughter, etc.), status updates, text associated with photos or comments under photos indicating household members' relationships. Profile data for the user can also be used to determine the household features of the user, e.g., an indication in the user's profile of another profile that corresponds to the user's wife.

To predict the household features of a user, the online system applies one or more models trained using deep learning techniques to generate the predictions, e.g., a trained image model for analyzing image data to identify human faces in a photo, and a trained text model for analyzing text data such as tag information for the photo (e.g., the user tagged his father and mother in the photo) and profile data and actions taken by the user or connections of the user in the online system. The online system uses the trained models to predict the household features of the user based on the image data analysis and text data analysis. The online system uses the predictions to build more information about the user in the online system, e.g., by generating a comprehensive profile of the user including the user's household features. The predictions are useful for improved and targeted content delivery to a user that may have disparate information scattered throughout one or more online systems.

The figures depict various embodiments for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
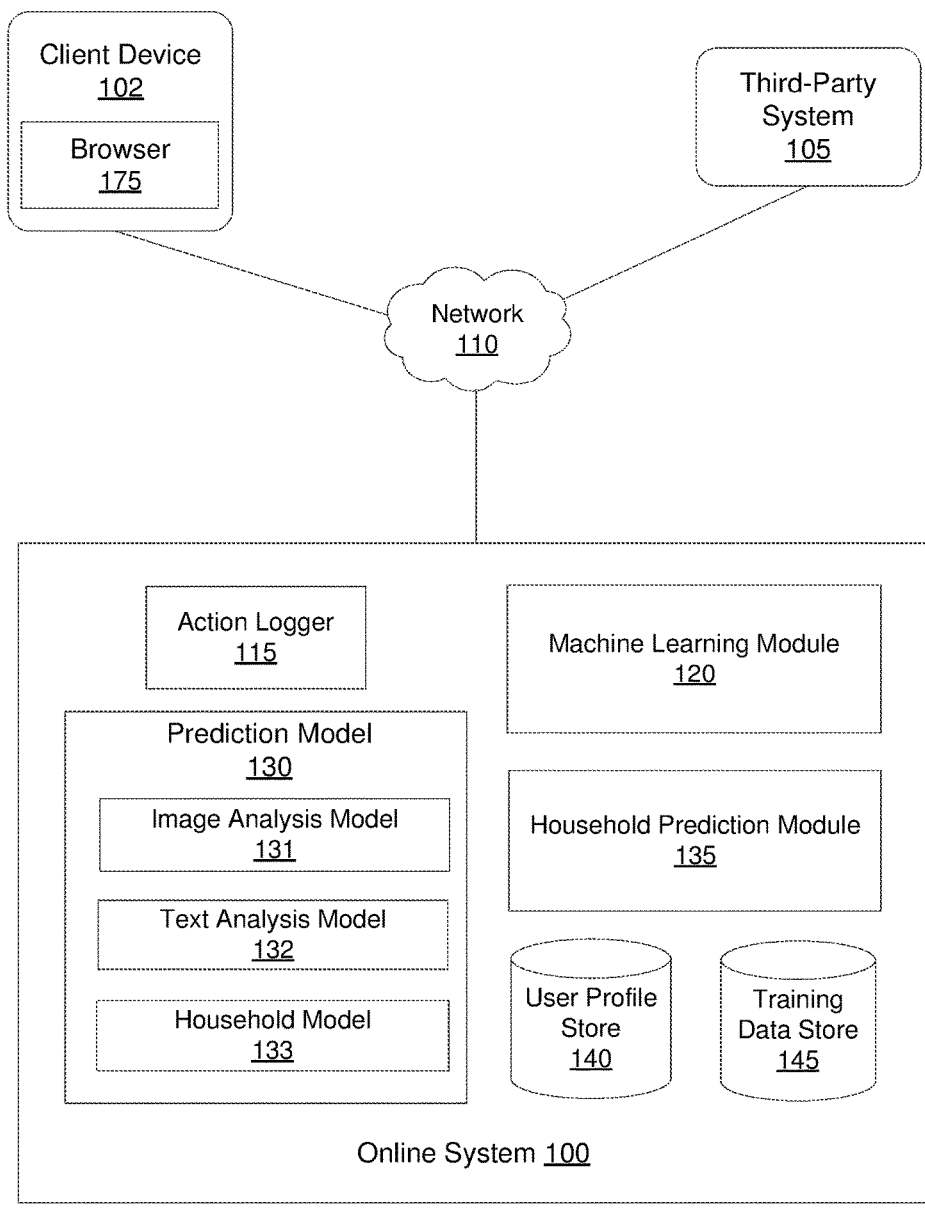
FIG. 1 is a system environment for predicting household features of a user based on image data and text data associated with the user, in accordance with an embodiment.

FIG. 1 is a system environment for predicting household features of a user based on image data and text data associated with the user, in accordance with an embodiment. In the embodiment shown in FIG. 1, the system environment includes a client device 102 operated by a user of an online system 100, a third party system 105, and the online system 100. The client device 102, the third party system 105, and the online system 100 communicate with one another through a network 110. While FIG. 1 shows one client device 102 for simplicity, each with a browser 175, one online system 100, and one third party system 105, it should be appreciated that any number of these entities may be included in the system environment. In alternative configurations, different and/or additional entities may also be included in the system environment. In some embodiments, the online system 100 is a social networking system, and the third party system 105 is a visual storytelling system such as an INSTAGRAM™ system, or a partner system of the online system 100. One or more of the third party systems 105 can also be social networking systems.

A client device 102 is a computing device capable of receiving user input through a browser 175, as well as transmitting and/or receiving data via the network 110. Examples of client devices 102 include desktop computers, laptop computers, tablet computers (pads), mobile phones, personal digital assistants (PDAs), gaming devices, or any other electronic device including computing functionality and data communication capabilities. A user of the client device 102 can login to the online system 100 and interact with web pages provided by the online system 100 or the third party system 105. As one example, a user may access a web page of a third party system 105 through the browser 175 of a client device 102 and make a purchase for a product. Similarly, a user of the client device 102 can login to the third party system 105 to share content with other users connected to him/her in the third party system and in the first online system 100. Additionally, the client device 102 may have a device identifier that uniquely identifies the client device 102.

The network 110 facilitates communications among one or more client devices 102, the online system 100, and the third party system 105. The network 110 may be any wired or wireless local area network (LAN) and/or wide area network (WAN), such as an intranet, an extranet, or the Internet. In various embodiments, the network 110 uses standard communication technologies and/or protocols. Examples of technologies used by the network 110 include Ethernet, 802.11, 3G, 4G, 802.16, or any other suitable communication technology. The network 110 may use wireless, wired, or a combination of wireless and wired communication technologies. Examples of protocols used by the network 110 include transmission control protocol/Internet protocol (TCP/IP), hypertext transport protocol (HTTP), simple mail transfer protocol (SMTP), file transfer protocol (TCP), or any other suitable communication protocol.

In one embodiment, the third party system 105 represents another online system that can be separate from the online system 100 in that the two online systems may not otherwise share user demographics. For example, the online system 100 and the third party system 105 are in separate domains but have certain management connections of their operations. In one embodiment, the third party system 105 is an INSTAGRAM™ system, which allows users to share pictures and videos either publically or privately within the system, as well as through other online systems such as the online system 100. A user can login using a specific ID belonging to the user on the third party system 105 (e.g. INSTAGRAM ID). Users of the third party system 105 can upload photos and videos to the third party system 105, follow other users' news feeds, and tag uploaded images with geolocation information (e.g., longitude and latitude coordinates, and/or the name of a location).

The third party system 105 may maintain user profiles in a user profile store, each user profile identified by a user identity (e.g. INSTAGRAM ID) and associated with a user of the third party system 105. A user profile of a user of the third party system 105 may include declarative information about the user that was explicitly shared by the user and may also include profile information inferred by the third party system 105. In one embodiment, a user profile includes multiple data fields, each describing one or more attributes of the corresponding user of the third party system 105. Examples of information stored in a user profile include biographic, demographic, and other types of descriptive information, such as work experience, educational history, age, gender, hobbies or preferences, location and the like. A user profile may also store other information provided by the user, for example, profile images. In certain embodiments, a profile image of a user may be tagged with identification information of the user of the third party system 105 displayed in an image. The user profile store associated with the third party system 105 further stores data describing one or more relationships between different users and allows users to specify their relationships with other users within the third party system 105.

In another embodiment, the third party system 105 represents any external system outside of the online system 100. For example, the third party system 105 may be a third party retailer that sells products of interest to users of the online system 100. In some embodiments, the two systems are completely independent and without any ownership or management connection. The third party system 105 is responsible for providing data to a user. For example, the third party system 105 provides web page interfaces (e.g. online shopping cart page) for a user to make an online purchase for a product. The user can login using a specific ID belonging to the user on the partner system (e.g. partner system user ID). Additionally, the user may provide personally identifiable information (PII), such as PII that might be provided in a purchase process or during registration as a user of the online system 100. Both the specific ID identifying the user on the partner system as well as the PII information provided by the user may be stored by the third party system 105 in a database of the third party system 105, as a cookie on the user's browser 175, among other locations.

The online system 100 can receive the user information in various ways and from various online systems separate/external to the online system 100, e.g. the third party system 105. These separate/external systems can directly send the text data, e.g., the textual description of user profiles, and image data, e.g., profile photos of user profiles, to the online system 100, or the online system 100 may receive them via other sources, such as via cookies, via tracking pixels on web pages associated with the third party system 105, or from mobile applications associated with the third party system 105.

In some embodiments, the online system 100 receives information of a user and information about the behavior of the user on various web pages of the third party system 105 using a tracking pixel that the third party system 105 places on the web pages. For example, a user searches for flights to Vienna, Austria on a web page domain hosted by the third party system 105. In one embodiment, the tracking pixel is a segment of HTML code that the online system 100 provides to the third party system 105 to be added to its web pages. For example, a tracking pixel is a transparent 1×1 image, an iframe, or other suitable object. When a user's browser 175 requests the content of a page having the tracking pixel, the HTML code makes a server call to the online system 100, which returns a 1×1 transparent image (e.g., a GIF), and the server call also sends certain information about the user or the actions the user is taking to the online system 100. For example, it may send information about the actions the user was taking on the web page (e.g., putting a product in a shopping cart, completing a checkout process, browsing a product page, etc.), price of product a user looked at or purchased, a SKU number for the product, a color, style, type or size of the product, a timestamp, a user identifier for the user that is used by the third party system 105, among other data. In addition, when the server call is made to the online system 100, the online system 100 can request a cookie that was previously placed on the browser by the online system 100, from which the online system 100 can acquire information about the client device 102 and the browser 175, such as the Internet Protocol (IP) address of the client device 102, an online system user ID for the user, etc. If the browser 175 used to visit the website does not include a cookie previously set by the online system 100, a cookie is then set on the browser 175. If the browser 175 includes a cookie already, the online system 100 can access the cookie.

In one embodiment, the third party system 105 can allow the online system 100 access to a system cookie that stores information that the third party system 105 has about a user, browser, device, etc. (this may require user permission for this type of sharing). For example, if the third party system 105 is closely affiliated or owned by the online system 100

(e.g., INSTAGRAM™ and FACEBOOK™), the two parties may work together such that the server call to the online system domain results in a redirect of the user's browser to the third party system domain, and under the third party system domain, the third party system cookie can be requested from the browser 175 before the browser is directed back to the online system 100 resulting in the online system 100 having access to the third party system cookie. The third party system cookie may include the third party system's user identifier for the user, a browser ID, a client device ID, and other information the partner system tracks for the user, e.g., a user profile, and a profile photo. Thus, the online system 100 gains access to identifiers and behavioral information that are associated with the user from interactions between the user and the third party system.

In one embodiment, a user logs into an account on the online system 100 to access a personalized set of web pages, such as a user profile page and a newsfeed page, using a browser 175. When a user logs in to its account with the online system 100, the online system 100 writes one or more cookies to the client device 102, such as to the browser 175, identifying the user and the browser. For example, a cookie including a user identifier associated with the user by online system 100 is stored and a cookie including a browser identifier is stored by the client device 102; the cookie including the browser identifier may include data identifying a browser type. While the user is logged in to the online system 100 using the browser 175, the cookie including the user identifier is stored by the browser 175. The cookie including the browser identifier is stored until it is deleted by the user or deleted by the browser 175. In one embodiment, users may opt out of receiving cookies from the online 100 to prevent the online system 110 from storing cookies using the browser 175.

In one embodiment, the online system 100 predicts household features of a user of its own online system. In another embodiment, the online system 100 stores household features of a user of the third party system 105. The online system 100 receives image data of a user of the third party system 105, e.g., profile images of the user, and textual information describing the user, from the third party system 105, and predicts the household features of the user based on the received data of the user. In one embodiment, the user of the third party system 105 has a corresponding user profile on the online system 100. Example embodiments matching a user across multiple online systems based on image data and textual data associated with the user are further described in U.S. patent application Ser. No. 15/497,454, filed on Apr. 26, 2017, which is hereby incorporated by reference in its entirety. The predictions for the user of the third party system 105 can be used to build more information about the corresponding user in the online system 100, e.g., building a comprehensive user profile for the user, and to provide more relevant content to the user on the online system 100.

In various embodiments, the online system 100 includes a user profile store 140, a training data store 145, an action logger 115, a machine learning module 120, a prediction model 130, and a household prediction module 135. In the embodiment shown in FIG. 1, the prediction model 130 includes an image analysis model 131 and a text analysis model 132. In alternative configurations, different and/or additional entities may also be included in the online system 100.

The online system 100 maintains user profiles associated with users of the online system 100 in the user profile store 140, each user profile identified by a user ID and associated with a user of the online system 100. A user profile of a user of the online system 100 may include declarative information about the user that was explicitly shared by the user and may also include profile information inferred by the online system 100. In one embodiment, a user profile includes multiple data fields, each describing one or more attributes of the corresponding user of the online system 100. Examples of information stored in a user profile include biographic, demographic, and other types of descriptive information, such as work experience, educational history, age, gender, hobbies or preferences, location and the like. A user profile may also store other information provided by the user, for example, profile images. In certain embodiments, a profile image of a user may be tagged with identification information of the user of the online system 100 displayed in an image. The user profile store associated a user within the online system 100 may further store other image data of the user, e.g., photos posted by other users who are socially connected with the user, and the posted photos may include members of the user's household. The user profile store associated with the online system 100 further stores data describing one or more relationships between different users, e.g., relationships among family members, and allows users to specify their relationships with other users within the online system 100. For example, the photos associated with the user may have tag information indicating relationships (e.g., a tag indicating a husband, wife, daughter, etc.), text associated with the photos or comments under the photos indicating household members' relationships.

In some embodiments, a user profile stores a household device-user graph, which links one or more household devices with the user. A household device is a networking electronic device used in a household, commonly shared by multiple users of the household. The online system 100 identifies household devices based on the information uniquely identifying the household devices and users of the identified household devices based on the information describing the usage of the household devices. For example, the online system 100 identifies each identifier associated with each household device and associated household device information, and assigns a device ID associated with the device identifier. The online system 100 further identifies household device users associated with the device IDs, and assigns a device user ID to each identified household device user. The online system 100 generates a device-user graph based on identification of household devices and corresponding household device users. The household device-user graph can be used by the online system 100 to infer the household features of the user. Example embodiments of generating household device-user graph are further described in U.S. patent application Ser. No. 15/294,621, filed on Oct. 14, 2016, which is hereby incorporated by reference in its entirety.

For each user of the online system 100, the user profile can be bundled together into a comprehensive user profile with other user information that is associated with the same user across multiple online systems, e.g., the third party system 105. The other user information can be received by the online system 100 from the client device 102, or the third party system 105 (e.g., through the network 110). The profile data for the user can also be used to determine the household features of the user, e.g., an indication in the user's profile of another profile that corresponds to the user's wife.

The action logger 115 identifies interactions of users internal and external to the online system 100. User interactions internal to the online system 100 include interactions between users, interactions between a user and a page within the online system 100, interactions between a user and a post on a page. Examples of actions include adding a connection to another user, sending a message to another user, uploading an image, reading a message from another user, viewing content associated with another user, attending an event posted by another user, among others. These interactions may be stored as an association (e.g. an edge in a social graph) between the user (e.g. a first node in the social graph) and the entity that the user interacted with (e.g. a second node in the social graph).

The action logger 115 may be used by the online system 100 to track user actions on the online system 100, as well as actions on third party systems 105 that communicate information to the online system 100. Users may interact with various objects on the online system 100, and the action logger 115 stores information describing these interactions in an action log. Examples of interactions with objects include: commenting on posts, sharing links, and checking-in to physical locations via a mobile device, accessing content items, and any other interactions. Additional examples of interactions with objects on the online system 100 include: commenting on a photo album, communicating with a user, establishing a connection with an object, joining an event to a calendar, joining a group, creating an event, authorizing an application, using an application, expressing a preference for an object ("liking" the object) and engaging in a transaction. Additionally, the action log records a user's interactions with sponsored content on the online system 100 as well as with other applications operating on the online system 100. In some embodiments, data from the action log is used to infer household features of a user (e.g., size and demographic composition of the user), interests or preferences of a user, augmenting the interests included in the user's user profile and allowing a more complete understanding of user preferences.

User interactions with a page outside the online system 100 include sharing photos and videos on a visual storytelling service hosted by a third party system 105, purchasing or reviewing a product or service using an online marketplace hosted by a third party system 105, registering with or subscribing to a website hosted by a third party system 105, requesting information from a third party system 105, and other similar actions. These interactions may be previously stored as a cookie on a browser 175 accessed by the user and subsequently provided to the online system 100. When an action is taken on and/or off the online system 100, an entry for the action is generated by the action logger 115 and associated with the user's user profile. Furthermore, a timestamp of each interaction is also logged by the action logger 115.

The machine learning module 120 trains one or more models, e.g., the image analysis model 131 and the text analysis model 132, using features based on training data from the training data 145. The machine learning module 120 can store the trained models 131 and 132 in the online system 100 and periodically re-train the models using features based on updated training data. Example features include image features and textual features associated with users of the online system 100. In some embodiments, the training data store 145 includes predetermined information about a population of users of the online system 100 provided to the online system 100 or from another module of the online system 100, e.g., the action logger 115 or user profile store 140.

In one embodiment, the machine learning module 120 retrieves training data from the training data store 145 and extracts image features from the training data. The machine learning module 120 trains the image analysis model 131 of the prediction model 130 using the extracted image features. The training data includes information about users of the online system 100, and information about users of the third party system 105. Examples of information about users of the online system 100 include profile photos of users of the online system 100, photos posted by the users of the online system 100, and photos posted by other users who are socially connected with a user within the online system 100 that may include members of the user's household. Examples of information about users of the third party system 105 include photos posted by users of the third party system 105 and/or photos posted by other users such as family members of the users.

In one embodiment, the machine learning module 120 trains the image analysis model 131 to recognize subject matter in content based on visual attributes of the content. Content may include, for example, profile images and descriptive information of users of various online systems. A visual attribute may include a visual pattern in an image or an image segment reflecting a characteristic property of subject matter depicted in content. Visual attributes may be based on one or a combination of, for example, appearance, color, shape, layout, and the like. For example, the extracted image features from the training data are visual features of human faces commonly used in user profile photos. The system can extract prominent aspects from the face, such as eyes, mouth, nose, chin, and also extract the geometry of the aspects and their distribution on the face. The system can look at the distances between the different aspects of the face and alignment of one portion relative to another. The facial image can be presented as a high dimensional vector with pixel values or a set of vectors in which each vector summarizing a particular local region of the face. The machine learning module 120 trains the image analysis model 121 to recognize human faces in image data using a facial recognition algorithm designed to use these extracted features or generated vectors to identify human faces.

In some embodiments, the image analysis model 131 is an image classifier trained by the machine learning module 120 to recognize visual attributes of an image class based on contextual cues gathered from a sample set of images selected from the training data stored in the training data store 145. The sample set of images may include a large enough number of images to ensure an accurate outcome by the classifier. The classifier may assign each item of content a statistical score corresponding to the extent the content falls within a particular image class. In some embodiments, the classifier may incorporate a hierarchical classifier, a linear classifier, or other classifier. In some embodiments, the classifier may be trained initially based on a selected subset of images maintained by the online system 100. The classifier may be retrained under various circumstances. For example, the classifier may be retrained periodically at a selected frequency or non-periodically as images are made available to the classifier. As another example, the classifier may be retrained upon the occurrence of certain events, such as events (e.g., Christmas parties) that are likely to cause a large number of images to be uploaded to the online system 100. As yet another example, the classifier may be retrained when the online system 100 receives a threshold number of new images. Retraining in these and other circumstances can refine the ability of the classifier to recognize visual attributes of image classes.

An image class may include, for example, human body parts (e.g., faces, beard, bone structures), objects (e.g., a cat, car, person, purse, etc.), brands or objects associated with brands (e.g., Coca-Cola®, Ferrari®), professional sports teams (e.g., the Golden State Warriors®, the San Francisco Giants®), locations or places of interest (e.g., Mount Everest), plants, (e.g., various types of orchids), structures (e.g., skyscrapers, bridges, houses), vehicles (e.g., airplanes, bicycles, cars, motorcycles), activities (e.g., swimming), phrases or concepts (e.g., a red dress, happiness), and any other thing, action, or notion that can be associated with content. While many examples provided herein may refer to a single "image class," it is noted that the image class may refer to a plurality of image classes or one or more image classes comprising an amalgamation of objects, brands, professional sports teams, locations, etc. Each image class has multiples sets of image features commonly associated with that image class, e.g., distinct visual features associated with male human faces.

In some embodiment, the machine learning module 120 also trains the image analysis model 131 to differentiate two images by comparing the two images in a selected representation space. In one embodiment, the machine learning module 120 trains the image analysis model 131 to compare images represented in corresponding color histograms and to measure dissimilarity between the histograms of two images in a variety of distance measure, e.g., $\chi 2$ statistics. In another embodiment, the machine learning module 120 trains the image analysis model 131 to compare images represented in a continuous probabilistic framework based on a mixture of Gaussians models and to measure dissimilarity between two images in terms of KL-divergence.

In one embodiment, the machine learning module 120 retrieves training data from the training data store 145 and extracts textual features from the training data. The machine learning module 120 trains the text analysis model 132 using the extracted textual features. Examples of textual features include descriptive text about users of the online system 100, and descriptive text about users of the third party system 105. Descriptive text about a user of an online system may include biographic, demographic, and other types of descriptive information, such as family relationships, work experience, educational history, gender, hobbies or preferences, location and the like. In one embodiment, the descriptive text about a population of users of the online system 100 and the third party system 105 are from corresponding user profiles and are provided to the online system 100.

In addition to profile data, the text analysis model 132 can also analyze other types of text associated with a user, such as text related to user actions. For example, a user may post content on a social networking or other online system, and this content may include text written by the user to describe what the user is currently doing, where the user is in a photo posted, or any other description about the user. The text analysis model 132 can also learn to recognize textual cues in these posts by the user that provide household profile type information about the user, such as an indication that the user and his household frequently travels, like music, visits art museums regularly, etc. The text analysis model 132 can also analyze other information associated with a user post, such as textual comments by other users on the system and textual replies by the user to those comments. Similarly, on a social networking system, the user may be connected to various other users, and those user's data can provide information about the user that might be relevant for building the user's profile, and so those connections' profiles, posts, comments, replies, etc. can also be analyzed. All of these various types of user activity information can be stored by the online system for the user and can be used in building a back-end household profile for the user that only the system itself sees, rather than a forward-facing profile that is shared with other users. The models learn from this textual data what data is valuable in building a user data profile.

In one embodiment, the machine learning module 120 trains the text analysis model 132 to recognize textual cues of subject matter in content. A textual cue may include a nonvisual indicator of the subject matter in content, e.g., tagged description of a user in his/her user profile, tag information of each photo of a user indicating relationships of persons in the photo. Examples of textual cues include a descriptive tag, global positioning system (GPS) coordinates of a profile image, the identity of a tagger of the content, the identity of an uploader of the content, metadata associated with the content, identifies of people who view or like the given type of content, Exchange Image File (EXIF) information, etc. The machine learning module 120 trains the text analysis model 132 to recognize textual cues of subject matter in content using a variety of deep learning techniques, e.g., natural language processing techniques on body of texts or subtexts of user online profiles to determine keywords, phrases, or hashtags, and the like, that frequently appear in user online profiles.

In one embodiment, the machine learning module 120 trains the text analysis model 132 to identify household device information based on household device-user graphs. For example, the text analysis model 132 is trained to analyze each household device-user graph, and based on the analysis, to identify the links between one or more links between one or more household devices and a user, the IP address shared by one or more household devices associated with the user, and uniquely identifiers of the household devices and users of the identified household devices.

In some embodiment, the machine learning module 120 also trains the text analysis model 132 to differentiate two texts by comparing the two texts. In one embodiment, the machine learning module 120 trains the text analysis model 132 to compare texts based on keywords associated with the texts and to measure similarity between two texts. Example measures of similarity include cosine similarity or the generalized Euclidean distance between the vectors associated with the keywords of two texts.

Figure 2:
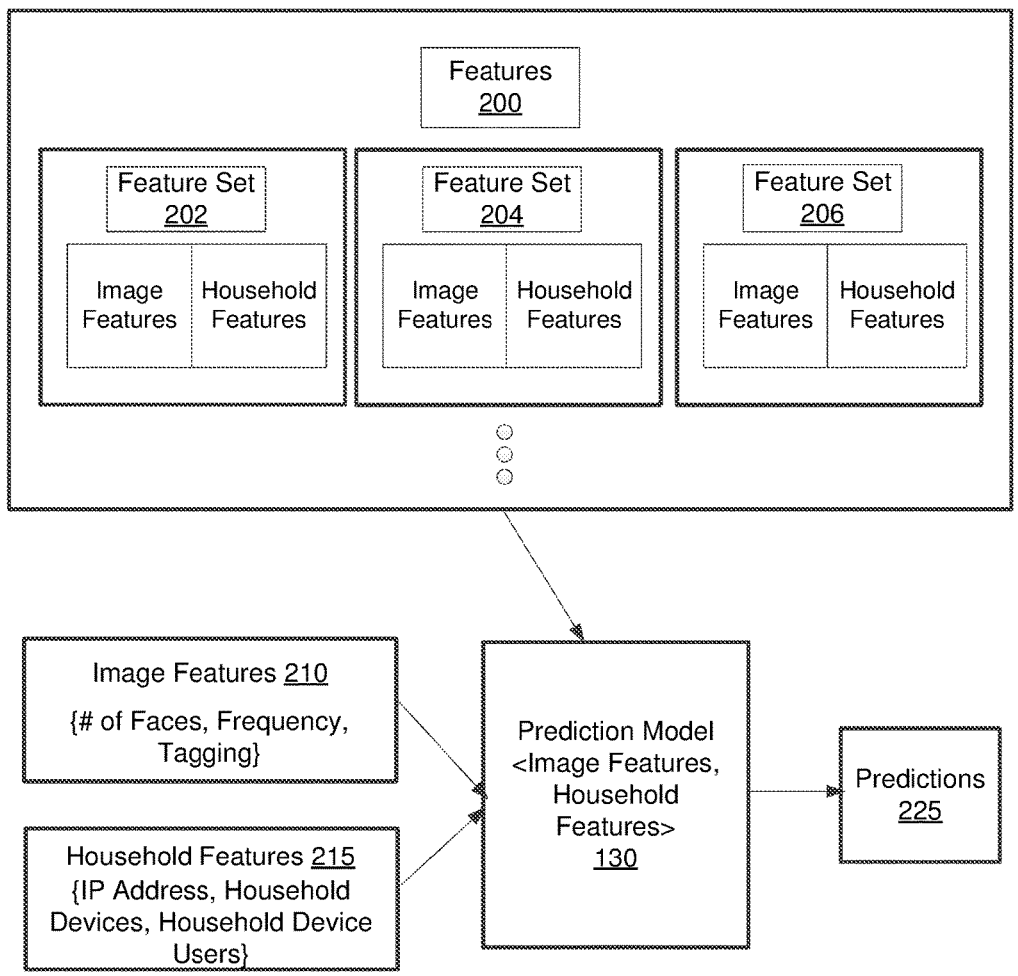
FIG. 2 is a data flow diagram for training a prediction model, in accordance with an embodiment.

Turning now to FIG. 2, FIG. 2 is a data flow diagram for training the prediction model 130, in accordance with one embodiment. The machine learning module 120 retrieves training data from the training data store 145 and extracts features 200 from the training data. The machine learning module 120 trains the prediction model 130 using the features 200. The training data includes information about users of the online system 100. The features 200 include one or more feature sets, e.g., feature sets 202, 204, and 206. Each feature set includes a set of image features and a set of household features. Though only three feature sets are shown in FIG. 2, in practice, the machine learning module 120 trains the prediction model 130 using many more feature sets, for example, including hundreds of different images features and thousands of different household features.

The prediction model 130 has an image analysis model 131 and a text analysis model 132 for training. In the example shown in FIG. 2, the prediction model 130 takes as input image features 210 and household features 215 and outputs predictions of household features of users in the training data. The image features 210 describe images of a target user (e.g., profile photos and photos posted by the user and/or by others socially connected with the user), whose household features (e.g., size and demographic composition) are to be predicted. The household features 215 are textual descriptions of the target user's household devices and corresponding users. Based on the input, the prediction model 130 generates a prediction of the household features of the target user. For instance, the image features 210 of the images associated with the target user include information derived from analysis of the images of the user, such as number of faces identified in each photo, frequency of one or more identified persons appearing together with the target user in the photos, and tagging information describing characteristics of the photos of the user such as relationships among the identified persons in a photo. The household features 215 include information describing the target user and information describing the household devices used by household members of the target user such as IP address, a number of identified household devices and their corresponding household users. Based on features from previous training data, the prediction model 130 determines predictions 225 such as the size of the user's household (e.g., 3) and demographic composition (e.g., a father, mother and daughter) of the household.

To generate features to train the prediction model 130, the machine learning module 120 can compare the extracted information from image data and text data associated with a target user with other extracted information from reference/sample image data and text data associated with users' household features included in the training data. For example, the reference image data include reference images, and the extracted information from the reference images indicates that the reference images include, on average, two to five people (e.g., a photo of people socializing at a Christmas party) identified by the image analysis model 132 using a human face or eye detection algorithm to identify the number of people in the reference images. The prediction model 130 determines that if the extracted information associated with images of a target user indicates that the images also includes two to five people (similar to the reference images) constantly appearing together as the reference images, then the target user has a similar demographic composition as those associated with the people shown in the reference images. To train the text analysis model 132 of the prediction model 130, the machine learning module 120 uses a similar process to generate textual features. For example, the machine learning module 120 uses natural language processing techniques on body of texts or creative subtexts to determine keywords, phrases, or hashtags, and the like, that frequently appear in content items that are popular among a group of target users.

The household prediction module 135 uses the trained image analysis model 131 and the text analysis model 132 of the prediction model 130 to predict household features of a user, e.g., size and demographic composition, based on the image data and text data associated with the user. In one embodiment, the household prediction module 135 predicts a size of a user's household based on the image data and the textual data of the user. For example, the household prediction module 135 determines a number of persons identified in each photo by the trained image analysis model 131, a frequency of each identified person or each identified group of persons among the photos of the user. The household prediction module 135 augments the household size determination based on analysis of household device-user graphs by the trained textual analysis model 132. For example, the household prediction module 135 determines one or more shared IP addresses used by household devices of the user's household, a number of household devices shared by one or more users of a household and a number of users associated with the identified household devices. Based on the household device information, the household prediction module 135 generates a prediction of size of the user's household.

The household prediction module 135 also predicts demographic composition of a user's household based on the image data and the textual data of a user. For example, the household prediction module 135 determines relationships between the persons identified in each photo of the user based on tag information associated with each photo, profile data of the user, comments associated with each photo of the user. The household prediction module 135 determines demographic composition of a household based on tag information, such as descriptors of tags (e.g., the tag "#family", the tag "#Christmas", etc.), the order of tags, whether particular tags are accompanied by other particular tags (e.g., whether the tag "#husband" is accompanied by the tag "#wife" or whether the tag "#mom" is accompanied by the tag "#children"), etc.

In some embodiments, the household prediction module 135 also analyzes social cues that indicate the status or a profile of a person in an online system 100. The person may be a generator and/or tagger of a particular image of the sample set of images. For instance, the household prediction module 135 may determine household features of a person based on the person's activities (e.g., past posts, status updates, friendships, messaging history, past tagging history, past image generating/browsing/commenting/sharing history, web browsing history, online profile, etc.), or relationships (e.g., husband-wife, parents-children).

Figure 3:
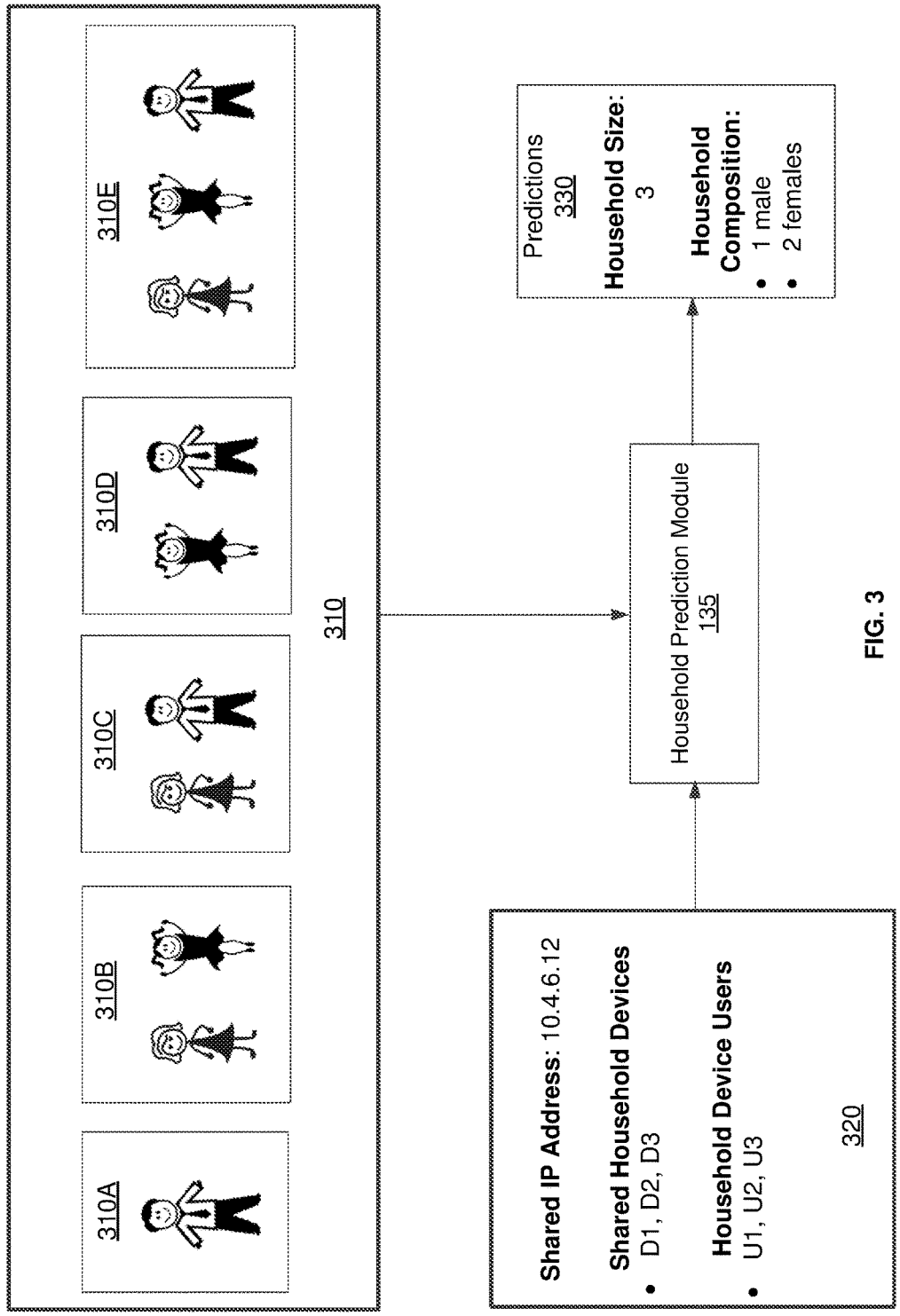
FIG. 3 is an example of predicting household features of a user by a trained prediction model, in accordance with an embodiment.

FIG. 3 is an example of predicting household features of a user by the household prediction module 135 using the trained prediction model 130, in accordance with an embodiment. In the example illustrated in FIG. 3, the household prediction module 135 receives user information, which includes image data 310 of the user and household information 320 describing the user and the user's household. The image data 310 includes five images, images 310A, 310B, 310C, 310D and 310D, associated with the user of the online system 100. The images 310A-310D may be posted by the user himself, or posted by others users who are socially connected with the user such as the user's family members. Image 310A shows the user himself (e.g., a profile image of the user within the online system 100); image 310B shows two females posted by the user with a tag of "#my_boss_at_home;" image 310C shows the user with one of the females shown in image 310B; image 310D shows the user with a young girl, who is also depicted in image 310B, and the image 310D has a comment under the image: "my angel;" and image 310E shows the user with the two females who are also shown in at least one of images 310A-310D. Each of the images 310A-310D is classified into its respective image class by the trained image analysis model 131 (e.g., human faces), and has a set of visual features describing the image, such as distinct facial features and body parts associated with each person identified in images 310A-310D. The images features associated with the images 310A-310D are provided to the household prediction module 135 for predicting the household features, e.g., size, and demographic composition, of the user shown in image 310A.

Additionally, the household prediction module 135 receives household features associated with texts 320 describing the user and the user's household, e.g., textual description extracted from the user's profile, identified household devices, IP address shared by the identified household devices and corresponding users of the household devices, and social cues that describe the user's social connections with other persons identified in the images 310A-310D.

Based on visual features associated with the images 310A-310D and the household features of the texts 320 describing the user, the household prediction module 135 predicts the household features of the user depicted in image 310A, including size of the user's household (3) and demographic composition (e.g., one male, and 2 females, who are likely the male user's wife and daughter, respectively). The household prediction module 135 provides the predictions to the online system 100, which updates the user profile associated with the user within the online system 100, and selects content items for display to the user based on the predictions. The selected content items are more likely more suitable to the user and his household and have a higher click through rate by the user and by his household members.

Figure 4:
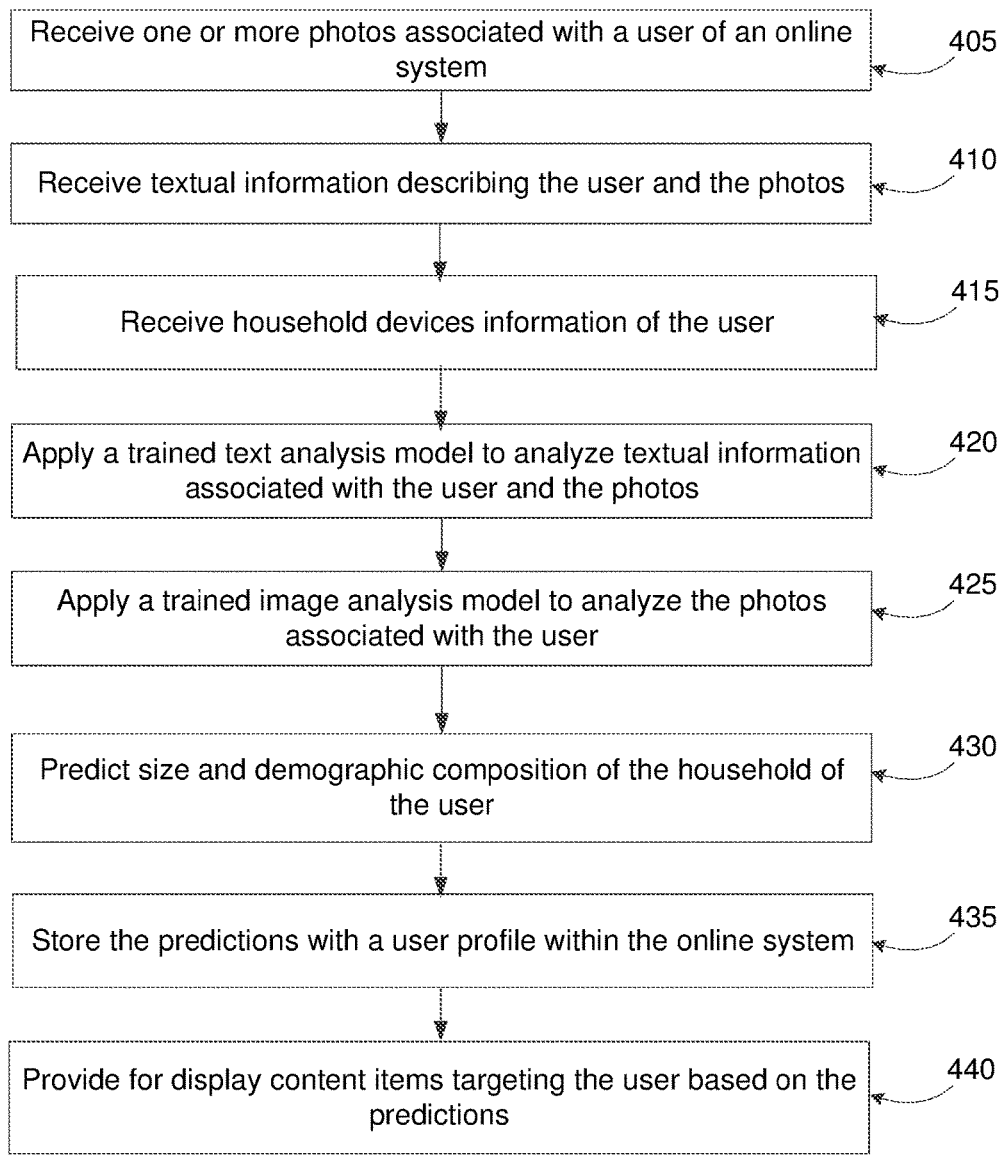
FIG. 4 illustrates a flowchart of predicting household features of a user based on image data and text data associated with the user, in accordance with an embodiment.

FIG. 4 illustrates a flowchart of predicting household features of a user based on image data and text data associated with the user, in accordance with an embodiment. Initially, the online system 100 receives 405 one or more photos associated with a user of an online system. The online system 100 receives 410 descriptive text describing the user, e.g., textual description of the user extracted from the user's profile or tagging information associated with the photos of the user. The online system 100 also receives 415 household devices information of the user, e.g., a number of identified household devices, IP address used by the identified household devices and their corresponding household device users.

The online system 100 applies 420 a trained text analysis model, e.g., the text analysis model 132, to analyze the textual information describing the user and the user's household devices. The analysis result is represented by one or more textual features associated with the user and the user's household devices.

The online system 100 applies 425 a trained image analysis model, e.g., the image analysis model 131, to the photos of the user. The analysis result includes information derived from the one or more visual features associated with the user and his/her household. Based on the analysis of the image features and household features of the user, the online system 100 predicts 430 the household features of the user, e.g., size and demographic composition, and stores 435 the predictions associated with a user profile within the online system 100, and provides 440 for display content items targeting the user based on the predictions.

General

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving one or more photos associated with a user of an online system, each of the received photos including a plurality of visual features associated with each individual in the received photo;
   receiving textual information describing the user and the one or more photos associated with the user;
   applying a trained image analysis model to the received one or more photos to identify the plurality of visual features associated with each individual in the received photos;
   applying a trained text analysis model to the textual information describing the user and the one or more photos to generate a plurality of textual features related to household features of the user;
   generating one or more predictions of the household features of the user based on the plurality of visual features associated with each individual in the received one or more photos and the textual features related to the household features of the user;
   evaluating a prediction of a number of members associated with a household of the user based on information describing a plurality of household devices and corresponding household device users associated with the user; and storing the generated predictions associated with a profile of the user within the online system, the stored predictions used in targeting content to the user and to other members of the user's household.

2. The method of claim 1, wherein the household features of the user comprise size of the user's household and demographic composition of the user's household.

3. The method of claim 1, wherein storing the generated predictions associated with a profile of the user within the online system comprises:
   supplementing the profile of the user within the online system with the predicted household features of the user; and
   generating a comprehensive profile of the user based on the supplementing of the profile of the user.

4. The method of claim 3, further comprising:
   sharing the comprehensive profile of the user within the online system with another online system where the user has another user profile.

5. The method of claim 1, further comprising:
   selecting one or more content items for display to the user on the online system based on the predictions of the household features of the user; and
   displaying the selected one or more content items to the user on the online system.

6. The method of claim 1, wherein the image analysis model is trained based on a machine learning scheme associated with image processing on a corpus of image training data.

7. The method of claim 1, wherein the text analysis model is trained based on a machine learning scheme associated with natural language processing on a corpus of textual training data.

8. The method of claim 1, further comprising:
   receiving information describing a plurality of household devices and corresponding household device users associated with the user; and
   applying the trained text analysis model to the received information to generate information describing the household features of the user.

9. The method of claim 8, wherein the information describing the household features of the user includes
   an Internet Protocol address shared by the plurality of household devices of user, the method further comprising determining at least one of a size and a demographic composition of the household of the user based on the plurality of visual features, the plurality of textual features, and the internet protocol address shared by the plurality of household devices.

10. The method of claim 1, further comprising reevaluating a prediction of a number of members residing in a household of the user based on information describing a plurality of household devices and corresponding household device users associated with the user.

11. A non-transitory computer-readable medium comprising computer program instructions, the computer program instructions when executed by a processor of a computer device causes the processor to perform the steps including:
   receiving one or more photos associated with a user of an online system, each of the received photos including a plurality of visual features associated with each individual in the received photo;
   receiving textual information describing the user and the one or more photos associated with the user;
   applying a trained image analysis model to the received one or more photos to identify the plurality of visual features associated with each individual in the received photos;
   applying a trained text analysis model to the textual information describing the user and the one or more photos to generate a plurality of textual features related to household features of the user;
   generating one or more predictions of the household features of the user based on the plurality of visual features associated with each individual in the received one or more photos and the textual features related to the household features of the user;
   evaluating a prediction of a number of members associated with a household of the user based on information describing a plurality of household devices and corresponding household device users associated with the user; and
   storing the generated predictions associated with a profile of the user within the online system, the stored predictions used in targeting content to the user and to other members of the user's household.

12. The non-transitory computer-readable storage medium of claim 11, wherein the household features of the user comprise size of the user's household and demographic composition of the user's household.

13. The non-transitory computer-readable storage medium of claim 11, wherein storing the generated predictions associated with a profile of the user within the online system comprises:
   supplementing the profile of the user within the online system with the predicted household features of the user; and
   generating a comprehensive profile of the user based on the supplementing of the profile of the user.

14. The non-transitory computer-readable storage medium of claim 13, further comprising computer program instructions, the computer program instructions when executed by the processor of the computer device causes the processor to perform the steps including:
   sharing the comprehensive profile of the user within the online system with another online system where the user has another user profile.

15. The non-transitory computer-readable storage medium of claim 11, further comprising computer program instructions, the computer program instructions when executed by the processor of the computer device causes the processor to perform the steps including:
   selecting one or more content items for display to the user on the online system based on the predictions of the household features of the user; and
   displaying the selected one or more content items to the user on the online system.

16. The non-transitory computer-readable storage medium of claim 11, wherein the image analysis model is trained based on a machine learning scheme associated with image processing on a corpus of image training data.

17. The non-transitory computer-readable storage medium of claim 11, wherein the text analysis model is trained based on a machine learning scheme associated with natural language processing on a corpus of textual training data.

18. The non-transitory computer-readable storage medium of claim 11, further comprising computer program instructions, the computer program instructions when executed by the processor of the computer device causes the processor to perform the steps including:

receiving information describing a plurality of household devices and corresponding household device users associated with the user; and applying the trained text analysis model to the received information to generate information describing the household features of the user.

19. The non-transitory computer-readable storage medium of claim 18, wherein the information describing the household features of the user includes an Internet Protocol address shared by the plurality of household devices of user, the non-transitory computer-readable storage medium further comprising instructions for determining a number of members belonging to the household of the user based upon the Internet Protocol address shared by the plurality of household devices.

20. The non-transitory computer-readable storage medium of claim 11, further comprising reevaluating a prediction of a number of members residing in a household of the user based on information describing a plurality of household devices and corresponding household device users associated with the user.

\* \* \* \* \*